United States Patent
DiSanto et al.

(10) Patent No.: US 7,085,376 B2
(45) Date of Patent: Aug. 1, 2006

(54) METHOD AND SYSTEM FOR SECURELY EXCHANGING ENCRYPTION KEY DETERMINATION INFORMATION

(75) Inventors: Frank J. DiSanto, North Hills, NY (US); Denis A. Krusos, Lloyd Harbor, NY (US)

(73) Assignee: Copytele, Inc., Melville, NY (US)

( * ) Notice: Subject to any disclaimer, the term of this patent is extended or adjusted under 35 U.S.C. 154(b) by 841 days.

(21) Appl. No.: 09/782,825

(22) Filed: Feb. 14, 2001

(65) Prior Publication Data

US 2002/0150237 A1    Oct. 17, 2002

(51) Int. Cl.
*H04K 1/00* (2006.01)
*H04L 9/00* (2006.01)
*H04L 9/28* (2006.01)

(52) U.S. Cl. .................. 380/28; 380/283; 380/284; 380/285; 380/44; 380/45; 713/169; 713/176; 726/5; 726/6

(58) Field of Classification Search ................ 713/169, 713/176; 380/277, 304, 28, 283–285, 44–45; 726/5–6
See application file for complete search history.

(56) References Cited

U.S. PATENT DOCUMENTS

| | | | |
|---|---|---|---|
| 4,200,770 A | 4/1980 | Hellman et al. | |
| 4,405,829 A | 9/1983 | Rivest et al. | |
| 4,642,424 A | 2/1987 | McNair | |
| 5,365,589 A | 11/1994 | Gutowitz | |
| 5,488,661 A | 1/1996 | Matsui | |
| 5,542,087 A | 7/1996 | Neimat et al. | |
| RE36,310 E * | 9/1999 | Bjerrum et al. | 713/168 |
| 6,009,176 A * | 12/1999 | Gennaro et al. | 713/170 |

* cited by examiner

*Primary Examiner*—Christopher Revak
*Assistant Examiner*—Longbit Chai
(74) *Attorney, Agent, or Firm*—Plevy, Howard & Darcy PC (57) ABSTRACT

A system and method for securely exchanging plurality of information items used to generate a plurality of encryption keys used in a public key-and-private key system. In accordance with the principles of the invention, elements of exchanged information items, such as public key and synchronizing indictors are encrypted before the exchange. The information item element is encrypted using an encryption key determined from information items that were previously exchanged. The encryption of information items used to determine subsequent encryption keys provides additional security to the encryption key used in the transmission of informational data as the encrypted elements of the information item must be decrypted before the data message encryption key can be decrypted. The process of exchanging encrypted information items can be repeated until an agreed upon number of encrypting keys is determined.

9 Claims, 8 Drawing Sheets

METHOD AND SYSTEM FOR SECURELY EXCHANGING ENCRYPTION KEY DETERMINATION INFORMATION

RELATED APPLICATION

This application relates to patent application Ser. No. 09/782,860 entitled, METHOD AND SYSTEM FOR SELECTING ENCRYPTION KEYS FROM A PLURALITY OF ENCRYPTION KEYS, filed concurrently, herewith, and assigned to the same assignee as hereof.

FIELD OF THE INVENTION

The present invention relates to communication networks, more specifically to secure encryption key information exchange communications.

BACKGROUND OF THE INVENTION

Increased popularity and use of the communication networks have made possible new methods of doing business, marketing goods and providing services to consumers or users. To insure that sensitive information, such as business strategy, credit card numbers, social security numbers, bank account balances, medical records, etc., are not disclosed when transmitted over unsecured networks, sensitive data items are encrypted (or encoded). Methods of encrypting sensitive information are well known in the art. For example, in a secure communication network, one party may possess an encoding key that is used to encrypt sensitive data items, while the receiving party possess a corresponding decrypting key to return a received encrypted message to its original form. In this method, if the encoding or decoding key becomes known to parties outside the secure network, the entire system is compromised as unauthorized parties are also able to decrypt encoded messages. To prevent unauthorized access to sensitive information, encoding and decoding keys are continuously changed. However, continuously changing encoding and decoding keys is burdensome as it requires the redistribution of new keys to each authorized member. However, during the distribution process, communication among the parties is limited until the new keys are distributed to all authorized members.

Another method of encryption that reduces the burden of redistributing encoding/decoding keys is the use of a public-and-private key system. In a public-and-private, key system, a first party issues a non-secret public key, over a communication network, such as a the public telephone system (PSTN), private telephone system, Internet, etc., while retaining, secretly, a private key. The public key is accessible to all parties that have access to the network, while access to the private key is limited solely to the issuing party. Members of the secure communication network can then use a received public key and their own retained private key to generate an encryption key that can be used to encrypt sensitive informational data items. The encrypted sensitive informational data message, when received by the party issuing the public key, can then be decrypted using an encryption key generated from a previously received public key and the retained private key. Thus, sensitive information messages can be securely transmitted between parties without the necessity of transferring secure keys by other methods or coordinating the use of previously transferred secure keys. Public-and-private key systems are well known in the art. Details of their operation are disclosed in U.S. Pat. No. 4,200,770, entitled "*Cryptographic Apparatus and Method*," dated Apr. 29, 1980, to Hellman, et al., and U.S. Pat. No. 4,405,829, entitled "*Cryptographic Communication System and Method*," dated, Sep. 20, 1983, to Rivest, et al.

However, the public-and-private key systems are subject to unauthorized access also. Public-and private key systems transmit public key parameters without the benefit of any security protection over unsecured networks. Hence, these initial parameters can be intercepted and used to attack the encryption key. Methods of attacking encryption keys, e.g., complex reverse mathematical algorithms, "brute force," etc., are also well known in the art and need not be discussed in detail herein. In these methods, the amount of encrypted data intercepted increases the chance of successfully determining the underlining encryption key. Consequently, a substantially long message may be successfully attacked and the security benefit of the encryption key can be lost.

Hence, there is a need to reduce the use of unsecured information items transmitted in exchanging public keys without imposing burdens on the users in such exchanges.

SUMMARY OF THE INVENTION

A method and system for exchanging, over an unsecured network, a plurality of information items that are used to generate a plurality of encryption keys is presented. In the present invention, a first set of information items necessary to determine a first encryption key are exchanged between the parties over an unsecured communication network. Subsequently, at least one next set of information items necessary to determine at least one next encryption key is exchanged between the parties. In each of the subsequent exchanges of information item sets, at least one information item is transmitted using a previously determined encryption key.

Hence, each party has available a plurality of encryption keys that were determined from information items that have been transmitted in encrypted form over the unsecured network.

BRIEF DESCRIPTION OF THE DRAWINGS

In the drawings.

It is to be understood that these drawings are solely for purposes of illustrating the concepts of the invention and are not intended as a definition of the limits of the invention. It will be appreciated that the same reference numerals, pos-

DETAILED DESCRIPTION OF THE INVENTION

Figure 1A:
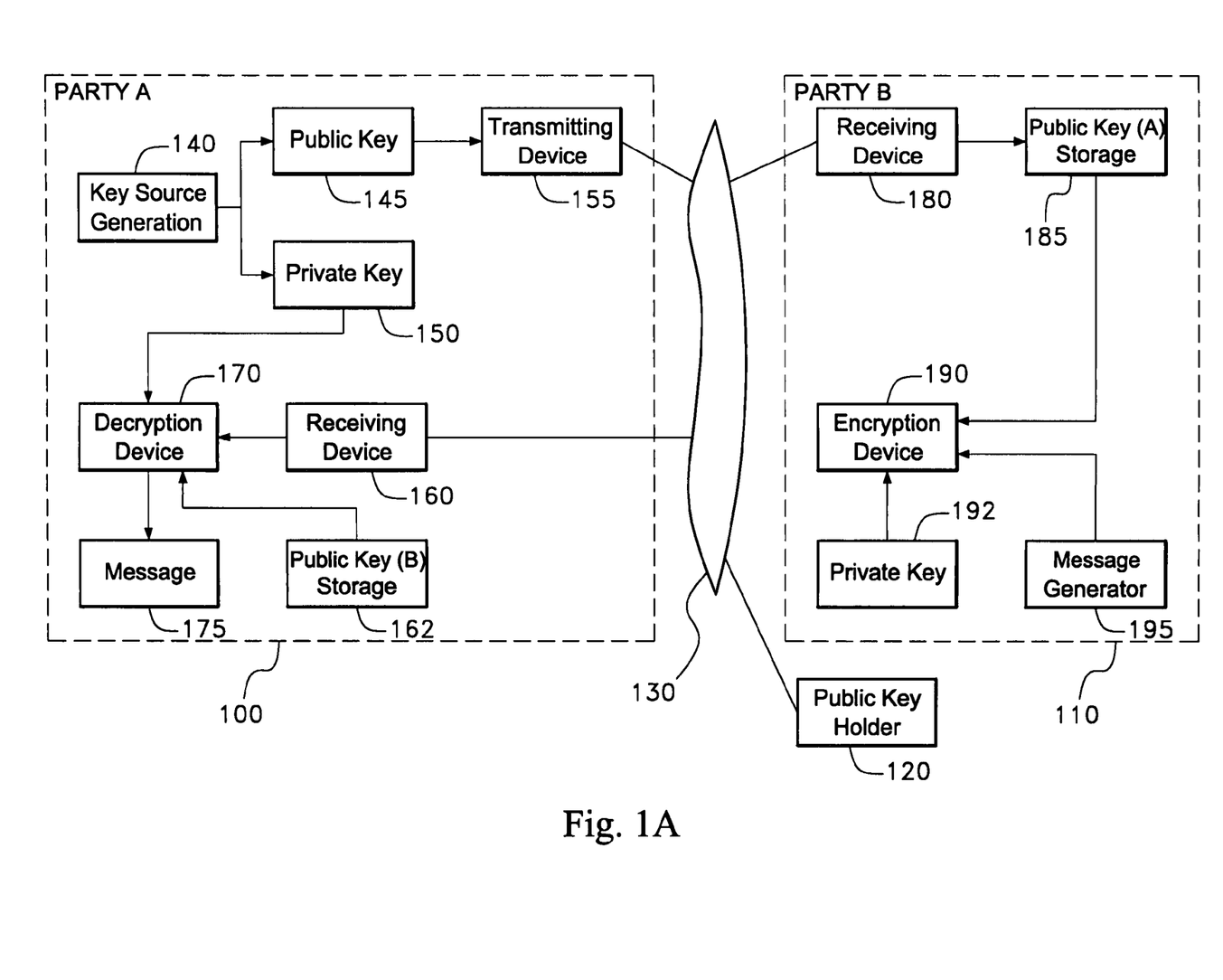
FIG. 1*a* illustrates an exemplary communication network configuration.

FIG. 1a illustrates an exemplary communication network 130, such as a public telephone system (PSTN), private telephone system, Internet, etc., wherein each of the exemplary parties, as represented by entities 100, 110 and 120, use a conventional public-and-private (PNP) encryption system. Accordingly, each party determines an encryption key using received public keys and a locally retained private key. A generated encryption key is then used to encrypt informational data messages that are to be sent over the network to the originator of the transmitted public key. The encrypted messages when received by the originator of the transmitted public key are then decrypted using a previously received public key and locally retained private key.

With reference to communication between illustrated Party A 100 and Party B 110, Party A 100 generates a public key, at block 145 and a private key, at block 150. The generated public key is then distributed through transmitting device 155 over network 130, and received by Party B 110.

Party B 110 upon receiving the public key transmitted by Party A 100, at receiving device 180 may, for example, store the received public key in a memory 185. Party B 110 then generates an encryption key using the public key received from Party A 100 and a locally determined, and retained, private key in encryption device 190. Although not illustrated, Party B 110 also determines a public key and a private key and transmits the public key to Party A 100, while retaining the private key. Hence, although the example disclosed herein illustrates the operation of an encrypted transmission from Party B 110 to Party A 100, it would be appreciated that similar encryption operations are performed when Party A 100 transmits an encrypted message to Party B 110.

When a message is to be transmitted from Party B 110 to Party A 100, the message stream, generated, in this example, by message generator 195, is input into encryption device 190, along with received public key of Party A 100 and retained private key of Party B 110. The message stream is then encrypted using the determined encryption key and transmitted over network 130. The encrypted message is then received by receiving device 160 of Party A 100. The received encrypted message, the previously transmitted public key of Party B 110 and the retained private key of Party A 100 are then input to decrypting device 170. Decrypting device 170 generates a decryption key, which decrypts the transmitted encrypted message and produces a plain-text version, as represented by block 175, which corresponds to the original message.

Figure 1B:
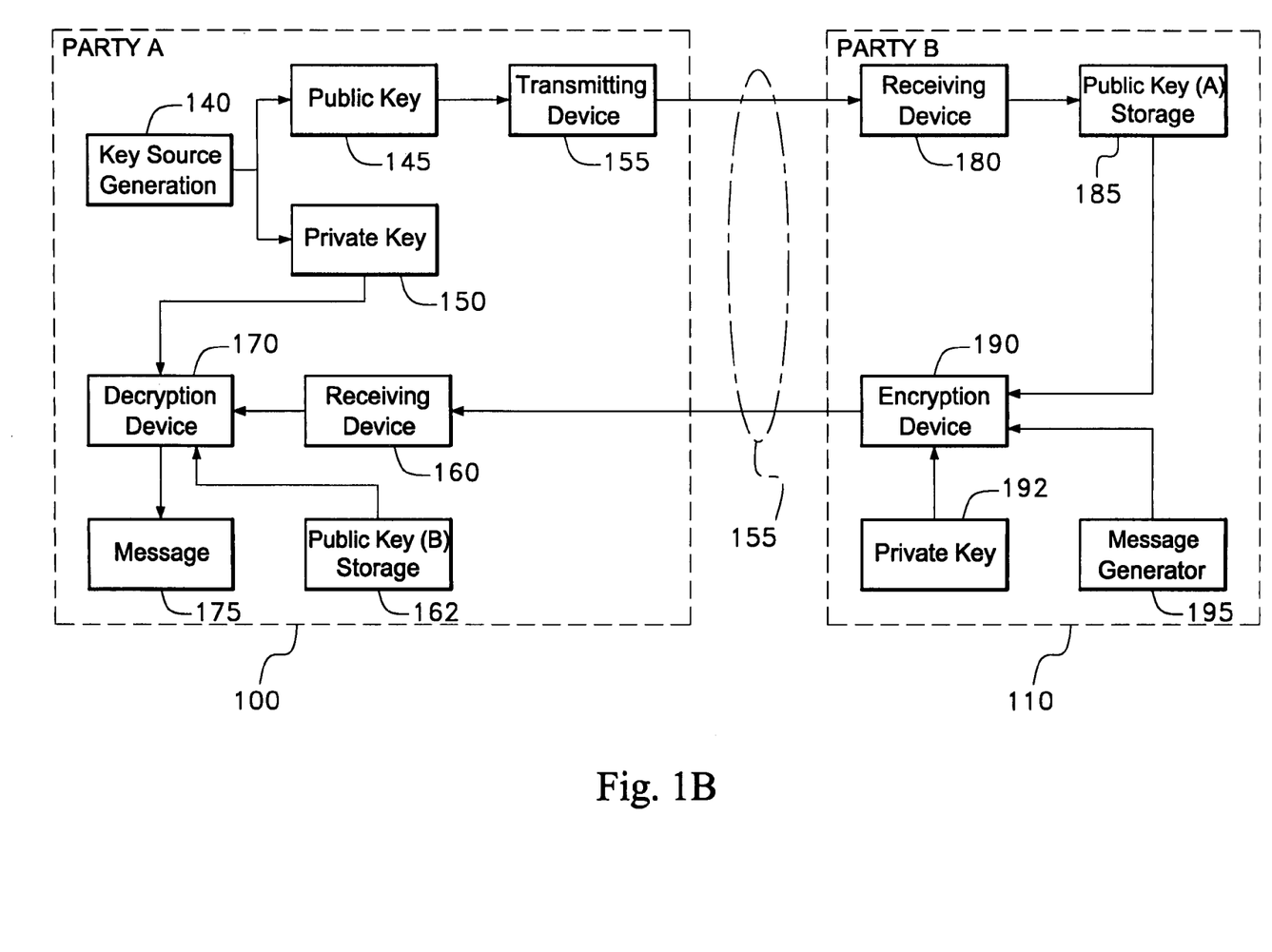
FIG. 1*b* illustrates an exemplary point-to-point communication network configuration.

FIG. 1b illustrates a similar communication exchange between Party A 100 and Party B 110 using a point-to-point network 135, such as the public telephone system (PSTN), private telephone system, etc.

Figure 2:
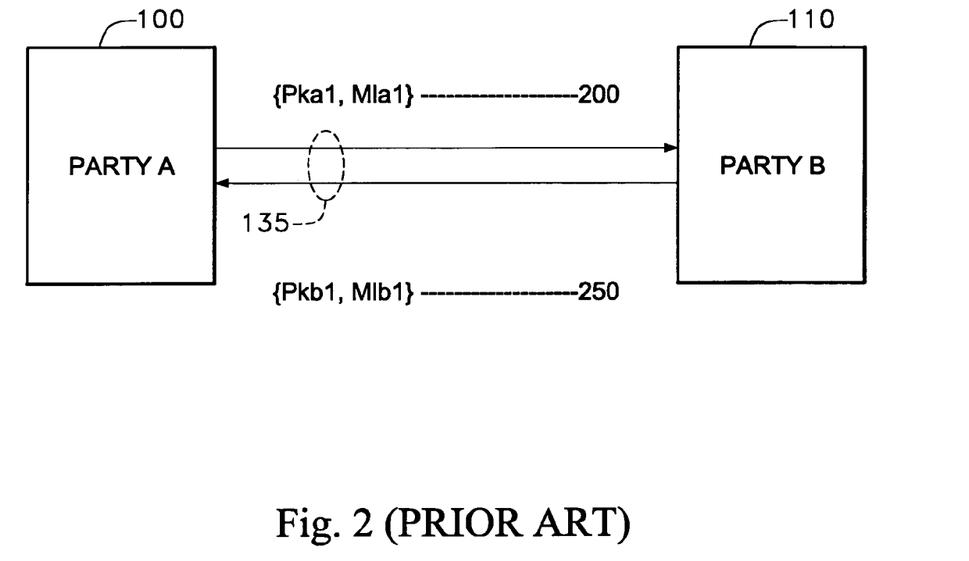
FIG. 2 illustrates an exemplary key information exchange over the exemplary network configuration illustrated in FIG. 1*b*.

FIG. 2 illustrates a typical exchange between parties in a communication network when a connection between the parties is first established. As illustrated, Party A 100 transmits unencrypted public key, as represented by $P_{ka}$, and key synchronizing indicator, $MI_a$ over unsecured network channel 135 Party B, similarly, transmits unencrypted public key, as represented by $P_{kb}$, and key synchronizing indicator $MI_b$. Key synchronizing indicators are used to alter the starting position of the encrypting sequence within the public key to prevent the same plain-text message from producing the same encrypted message. Consequently, altering the encryption sequence increases the difficulty in extracting the original message without the benefit of knowing the encryption key.

Each of the respective parties, upon receiving the transmitted public key and synchronization indicator, determines an encryption key from a retained private key, denoted as $P_r$, and the received public key, denoted as $P_k$ and synchronization indicator, denoted as MI. Accordingly, Party A 100 determines encryption key, $E_{ka}$, as a function of $P_{ra}$, $P_{kb}$ and $MI_b$, and Party B 110 determines encryption key, $E_{kb}$, as a function of $P_{rb}$, $P_{ka}$ and $MI_a$. Methods of determining encryption keys are well known in the art and need not be discussed in detail herein.

Figure 3:
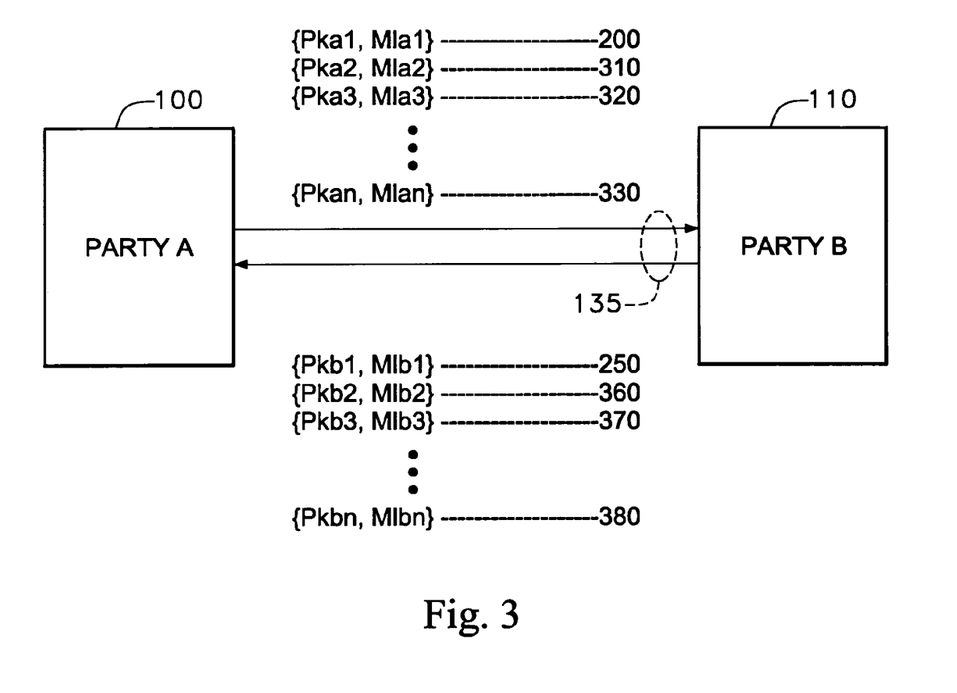
FIG. 3 illustrates an exemplary key information exchange over the exemplary network configuration illustrated in FIG. 1*b* in accordance with one aspect of the invention.

FIG. 3 illustrates an exemplary information exchange between Party A 100 and Party B 110 in accordance with one aspect of the invention. In this illustrative example, Party A 100 determines a plurality of public keys and synchronizing indicators, as represented by the pairs $\{P_{ka1}, MI_{a1}\}$ 300, $\{P_{ka2}, MI_{a2}\}$ 310, ... $\{P_{kan}, MI_{an}\}$ 330, etc. Similarly, Party B 110 determines a plurality of public keys and synchronizing indicators, as represented by the pairs $\{P_{kb1}, MI_{b1}\}$ 350, $\{P_{kb2}, MI_{b2}\}$ 360, ... $\{P_{kbn}, MI_{bn}\}$ 380, etc. Each party then initiates an exchange of information items to determine a plurality of encryption keys corresponding to each of the retained private keys, received public keys and synchronization indicators. Hence, Party A 100 determines encryption keys $E_{ka1}, E_{ka2}, \ldots E_{kan}$, etc., as $f(P_{ra1}, P_{kb1}, MI_{b1})$, $f(P_{ra2}, P_{kb2}, MI_{b2})$, ... $f(P_{ra3}, P_{kb3}, MI_{b3})$, etc., wherein f( ... ) is representative of known functions used for encryption key determination. Similarly, Party B 110 determines encryption keys $E_{kb1}, E_{kb2}, \ldots E_{kb3}$, etc., as $f(P_{rb1}, P_{ka1}, MI_{a1})$, $f(P_{rb2}, P_{ka2}, MI_{a2})$, ... $f(P_{rb3}, P_{ka3}, MI_{a3})$, etc. Party A and Party B, thus, each have available a plurality of encryption keys that can be used to encrypt and transmit sensitive message informational data items. In one embodiment of the invention, Party A 100 and Party B 110, can each pre-select at least one encryption key for message transmission from a plurality of determined encryption keys.

In an alternative embodiment of the invention, Party A and Party B each can selectively alternate between the available encryption keys during the transmission of a message. For example, Party A 100 can select a first encryption key to encode and transmit a known number of data bits. Party A 100 can then select a second encryption key to encrypt and transmit a second known number of data bits after the first transmission has completed. As would be appreciated, the selection of alternative encryption key is advantageous as alternating encryption keys during a message increases the difficult of recovering the original message without the benefit of knowing the encryption key or the alternating sequence.

Figure 4:
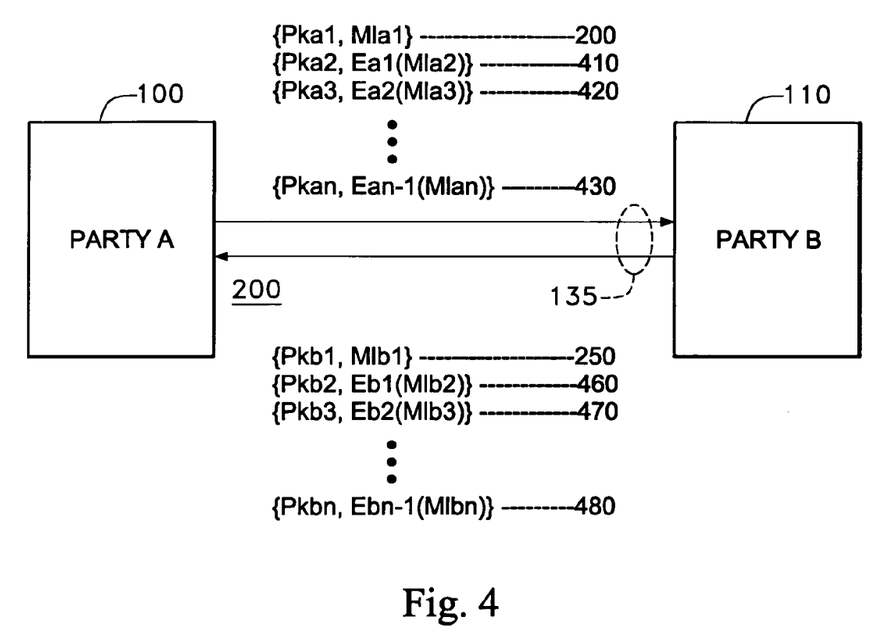
FIG. 4 illustrates a second exemplary key information exchange in accordance with a second aspect of the invention.
Figure 5:
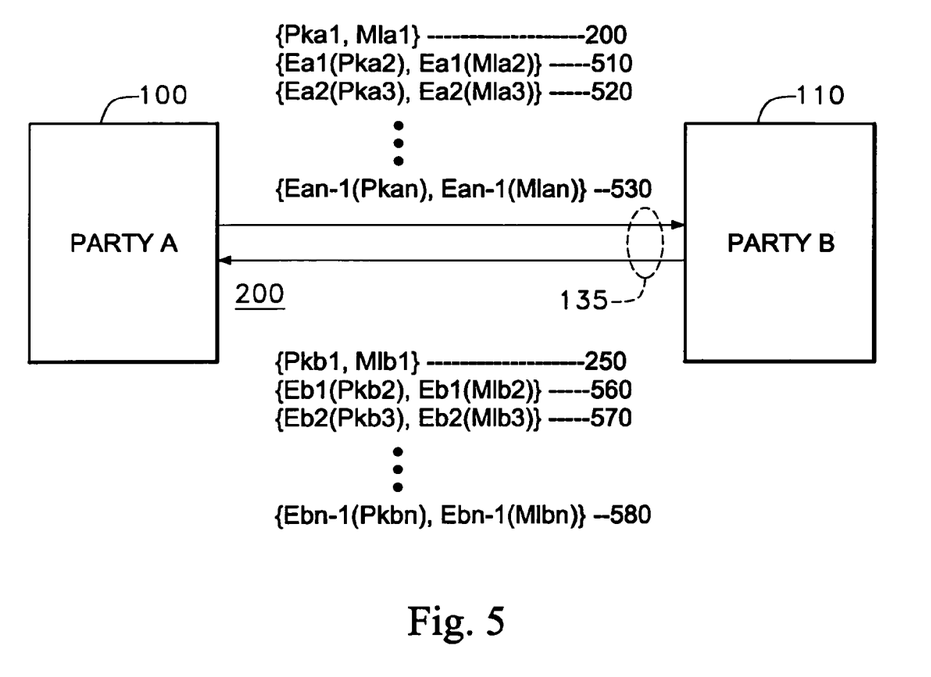
FIG. 5 illustrates a third exemplary key information exchange in accordance with another aspect of the invention.

FIG. 4 illustrates an exemplary exchange between Party A 100 and Party B 110 in accordance with a second aspect of the invention. In this illustrative example, Party A determines a first public key and a first synchronizing indicator, as represented by $\{P_{ka1}, MI_{a1}\}$ 200, and transmits these information items to Party B 110. These information items, used for determining encryption keys, are transmitted unencrypted over an unsecured network. Party B 110, similarly, generates a first public key and a first synchronizing indicator, i.e., $\{P_{kb1}, MI_{b1}\}$ 250 and transmits these information items to Party A 100. Party A 100, upon receiving public key and synchronizing indicator $\{P_{kb1}, MI_{b1}\}$ 250, determines first encryption key $E_{a1}$. Party A 100 then determines a second public key and a second synchronizing indicator, as represented by $\{P_{ka2}, MI_{a2}\}$. As would be appreciated, a second public key and second synchronizing indicator can be determined dynamically during an information item exchange, or before an information item exchange is initiated, as previously discussed in regard to FIG. 3.

Prior to transmitting second public key and second synchronizing indicator, $\{P_{ka2}, MI_{a2}\}$, to Party B 110, second synchronization indicator, $MI_{a2}$ is encrypted using first encryption key, $E_{a1}$. Second public key and encrypted second synchronizing indicator are then transmitted to Party B 110, as represented by pair $\{P_{ka2}, E_{a1}(MI_{a2})\}$ 410. Similarly, Party B 110 determines encryption key, $E_{b1}$, from information items $\{P_{ka1}, MI_{a1}\}$ 200, and transmits, to Party B, a second public key and an encrypted synchronizing indicator, as represented as $\{P_{kb2}, E_{b1}(MI_{b2})\}$ 460.

Party A 100 and Party B 100 each continue to determine encryption keys based on retained private keys and received public keys and synchronizing indicators until a known number of encryption keys have been determined. Thus, Party A 100 and Party B 110 each have available a plurality of encryption keys, which have been determined from encrypted data. Accordingly, encryption keys $E_{a2}, E_{a3} \ldots E_{an}$, and $E_{b2}, E_{b3} \ldots E_{bn}$, are more difficult to attack, as the encoded synchronizing indicators must first themselves be decoded before the encryption key can be decoded. This process of sending encrypted synchronization indicators is advantageous as fewer information items used in establishing the encryption keys are transmitted without the benefit of security protection.

Table 1 tabulates an exemplary four key exchange sequence performed by Party A 100 determining public keys, $P_{kai}$, private keys $P_{rai}$, synchronization indicators, $MI_{ai}$ and encryption keys, $E_{ai-1}$, in accordance with the principles of the invention.

key, $P_{ka1}$, received public key, $P_{kb1}$, and received synchronization indicator, $MI_{b1}$ (see seq. no. 3). Party A 100 then determines a second private key, $P_{ra2}$, a second public key, $P_{ka2}$, and a second synchronization indicator, $MI_{a2}$. Party A 100 then transmits second public key, $P_{ka2}$, and an encrypted second synchronization indicator, $MI_{a2}$, to Party B 110 using first encryption key, $E_{a1}$, i.e. $E_{a1}(MI_{a2})$ (see Seq. 4). Party B 110 performing similar operations as Party A 100, transmits to Party A 100 a second public key, $P_{kb2}$, and an encrypted second encrypted synchronization indicator, $E_{b1}(MI_{b2})$ (see seq. no. 5). Party A 100 receiving a second public key, $P_{kb2}$, and second encrypted synchronization indicator, $E_{b1}(MI_{b2})$ decrypts the encrypted synchronization indicator and determines a second encryption key $E_{a2}$ as a function of private key, $P_{ka2}$, received public key, $P_{kb2}$, and received synchronization indicator, $MI_{b2}$ (see seq. no. 6). This process of key exchange is iteratively repeated until a known number of key exchange have occurred.

In an alternate embodiment of the invention, first synchronization indicator, $MI_{a1}$, can also be transmitted encrypted using a encryption key, $E_0$. In this case, encryption key, $E_0$, is such that the transmitted sequence is the same as the plain-text sequence, i.e., $E_0(MI_{a1}) = MI_{a1}$. Thus, first public key, $P_{ka1}$, and encrypted synchronization indicator, $E_0(MI_{a1}) = MI_{a1}$, can be transmitted to Party B 110. Further still, encryption keys $E_{i-1}$, $i = 2 \ldots N$, can also be set equal to $E_0$, such that $E_{i-1}(MI_1) = MI_1$. In this case, the system depicted in FIG. 4 is similar to that depicted in FIG. 2. This system is advantageous as the same system may be used to transmit messages in plain-text or in encrypted text merely by altering encryption keys, appropriately.

In another aspect of the invention, transmitted public keys can also be encrypted using a previously determined encryption key. Table 2 tabulates an exemplary exchange sequence

TABLE 1

GENERATION OF ENCRYPTION KEYS

| Seq. No. | Determine | Transmit | Receive | Determine |
|---|---|---|---|---|
| 1 | $P_{ra1}, P_{ka1}, MI_{a1}$ | $P_{ka1}, MI_{a1}$ | | |
| 2 | | | $P_{kb1}, MI_{b1}$ | |
| 3 | | | | $E_{a1} = f(P_{ra1}, P_{kb1}, MI_{b1})$ |
| 4 | $P_{ra2}, P_{ka2}, MI_{a2}$ | $P_{ka2}, E_{a1}(MI_{a2})$ | | |
| 5 | | | $P_{kb2}, E_{b1}(MI_{b2})$ | |
| 6 | | | | $E_{a2} = f(P_{ra2}, P_{kb2}, MI_{b2})$ |
| 7 | $P_{ra3}, P_{ka3}, MI_{a3}$ | $P_{ka3}, E_{a2}(MI_{a3})$ | | |
| 8 | | | $P_{kb3}, E_{b2}(MI_{b3})$ | |
| 9 | | | | $E_{a3} = f(P_{ra3}, P_{kb3}, MI_{b3})$ |
| 10 | $P_{ra4}, P_{ka4}, MI_{a4}$ | $P_{ka4}, E_{a3}(MI_{a4})$ | | |
| 11 | | | $P_{kb4}, E_{b3}(MI_{b4})$ | |
| 12 | | | | $E_{a4} = f(P_{ra4}, P_{kb4}, MI_{b4})$ |
| 13 | $P_{ra5}, P_{ka5}, MI_{a5}$ | $P_{ka5}, E_{a4}(MI_{a5})$ | | |
| 14 | | | $P_{kb5}, E_{b4}(MI_{b5})$ | |
| 15 | | | | $E_{a5} = f(P_{ra5}, P_{kb5}, MI_{b5})$ |

In this example, Party A 100 generates first private key, $P_{ra1}$, first public key, $P_{ka1}$, and first synchronization indicator, $MI_{a1}$. Party A 100 then transmits first public key, $P_{ka1}$, and first synchronization indicator, $MI_{a1}$, to Party B 110 (see seq. no. 1). Party B 110 performing similar operations as Party A 100, which are not tabulated, transmits to Party A 100, a first public key, $P_{kb1}$, and first synchronization indicator, $MI_{b1}$. Party A 100 receiving a first public key, $P_{kb1}$, and first synchronization indicator, $MI_{b1}$ (see seq. no. 2) determines a first encryption key $E_{a1}$ as a function of private wherein exchanged public keys and synchronization indicators are encrypted using determined encryption keys. In this example, the processing steps are tabulated in Table 2 are identical to those discussed with regard to Table 1, except for the additional step of encrypting subsequent public Key using previously determined encryption keys prior to transmission. Hence, the process sequence would be appreciated and understood by those skilled in the are and the illustrated processing steps of Table 2 need not be discussed in detail herein.

TABLE 2

GENERATION OF ENCRYPTION KEYS

| Seq. No. | Determine | Transmit | Receive | Determine |
|---|---|---|---|---|
| 1 | $P_{ra1}, P_{ka1}, MI_{a1}$ | $P_{ka1}, MI_{a1}$ | | |
| 2 | | | $P_{kb1}, MI_{b1}$ | |
| 3 | | | | $E_{a1} = f(P_{ra1}, P_{kb1}, MI_{b1})$ |
| 4 | $P_{ra2}, P_{ka2}, MI_{a2}$ | $E_{a1}(P_{ka2}), E_{a1}(MI_{a2})$ | | |
| 5 | | | $E_{b1}(P_{kb2}), E_{b1}(MI_{b2})$ | |
| 6 | | | | $E_{a2} = f(P_{ra2}, P_{kb2}, MI_{b2})$ |
| 7 | $P_{ra3}, P_{ka3}, MI_{a3}$ | $E_{a2}(P_{ka3}), E_{a2}(MI_{a3})$ | | |
| 8 | | | $E_{b2}(P_{kb3}), E_{b2}(MI_{b3})$ | |
| 9 | | | | $E_{a3} = f(P_{ra3}, P_{kb3}, MI_{b3})$ |
| 10 | $P_{ra4}, P_{ka4}, MI_{a4}$ | $E_{a3}(P_{ka4}), E_{a3}(MI_{a4})$ | | |
| 11 | | | $E_{b3}(P_{kb4}), E_{b3}(MI_{b4})$ | |
| 12 | | | | $E_{a4} = f(P_{ra4}, P_{kb4}, MI_{b4})$ |
| 13 | $P_{ra5}, P_{ka5}, MI_{a5}$ | $E_{a4}(P_{ka5}), E_{a4}(MI_{a5})$ | | |
| 14 | | | $E_{b4}(P_{kb5}), E_{b4}(MI_{b5})$ | |
| 15 | | | | $E_{a5} = f(P_{ra5}, P_{kb5}, MI_{b5})$ |

Figure 6:
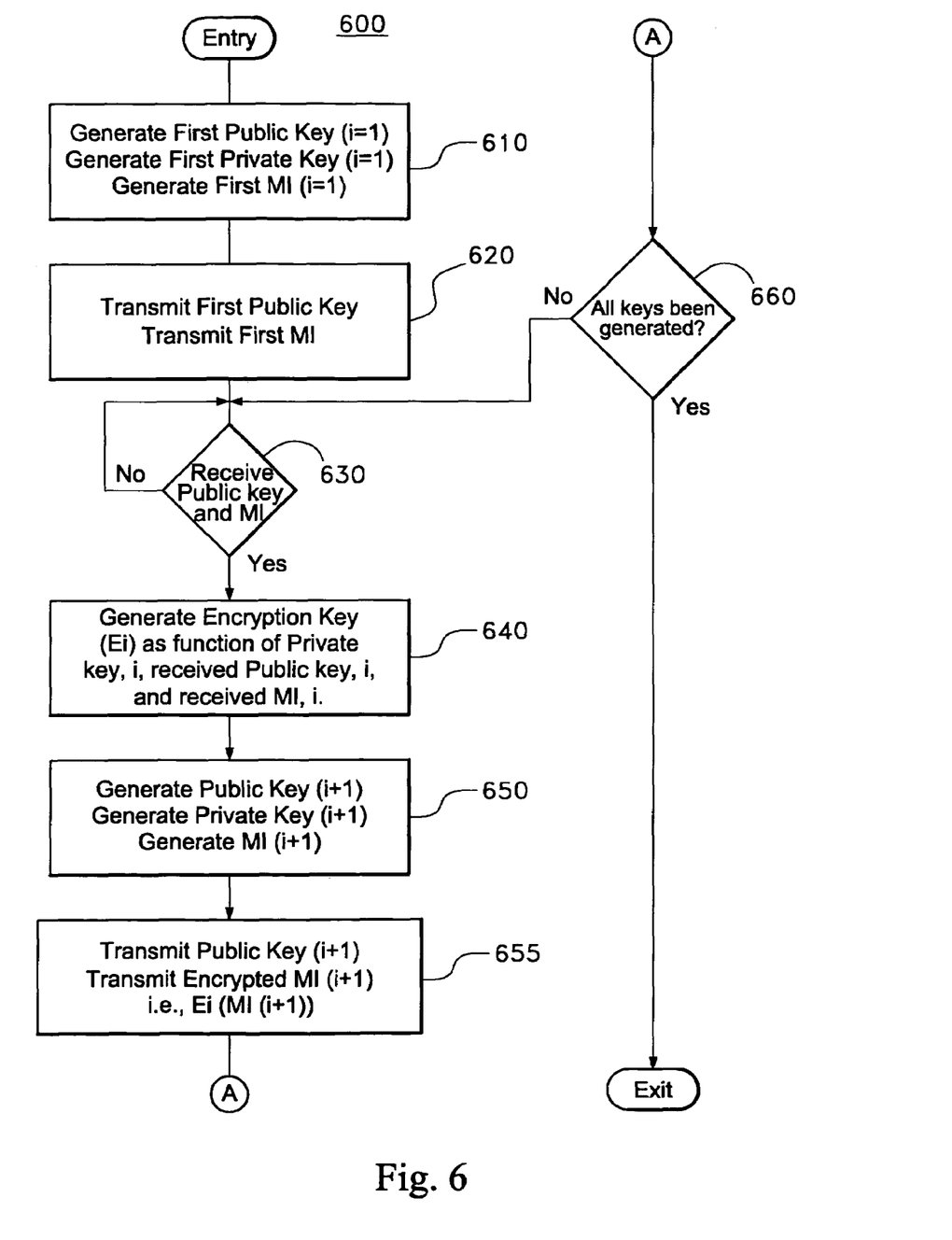
FIG. 6 illustrates an exemplary flow chart of the exemplary information exchange illustrated in FIG. 4.

FIG. 6 illustrates an exemplary flow chart of the processing in accordance with the principles of the invention generating encryption keys as tabulated in Table 1. As illustrated, each party, for example, Party A 100 in this illustrative example, determines, at block 610, a first public key, $P_{kai}$, a first private key, $P_{rai}$ and a first synchronization indicator, $MI_{ai}$ wherein i is equal to 1. First public key, $P_{kai}$, and first synchronization indicator, $MI_{ai}$, are then transmitted, at block 620, over the network, e.g., Party B 110. Party A 100 then waits, at block 630, for the reception of a public key from Party B 110. When a public key transmitted by Party B 110 is received, Party A 100 determines, at block 640, a first encryption key, as represented by $E_{ai}$, using previously retained first private key, $P_{rai}$, and received public key, $P_{kbi}$ and indicator $MI_{bi}$. Party A 100 then determines, at block 650, a second public key, $P_{kai}$, a second private key, $P_{rai}$ and a second synchronization indicator, $MI_{ai}$, where, in this case, i is equal to two. Second public key, $P_{kai}$, and encrypted second synchronization indicator, $E_{i-1}(MI_{ai})$, are then transmitted, at block 655, to Party B 110, for example. At block 660, a determination is made as to whether a known number of encryption keys have been determined. If the determination is in the negative, then the process awaits the reception of a next transmission from Party B 110. If the determination is in the affirmative, then the process of key determination is completed.

Figure 7:
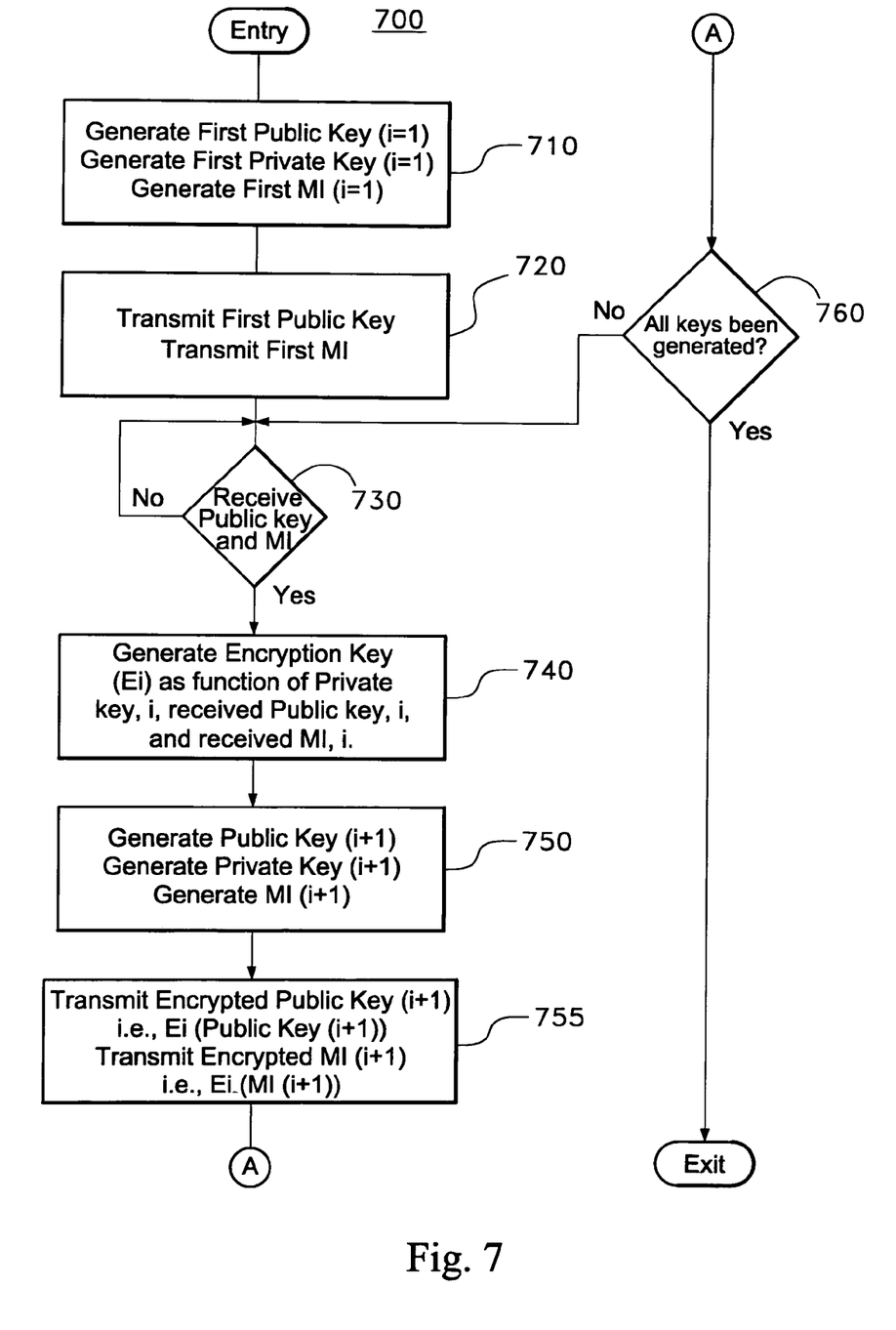
FIG. 7 illustrates an exemplary flow chart of the exemplary information exchange illustrated in FIG. 5.

FIG. 7 illustrates an exemplary flow chart of the processing in accordance with the principles of the invention generating encryption keys as tabulated in Table 2. As would be appreciated, the processing steps illustrated in FIG. 7 are identical to the processing steps illustrated in FIG. 6, except that each next public key is transmitted in encrypted form, as depicted in block 755. Hence, details of the processing illustrated in FIG. 7 need not be discussed as they would be understood by those skilled in the art.

While there has been shown, described, and pointed out, fundamental novel features of the present invention as applied to preferred embodiments thereof, it will be understood that various omissions and substitutions and changes in the methods described, in the form and details of the devices disclosed, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated.

We claim:

1. A computer implemented method for facilitating secure electronic communications among at least two parties over a communication network, comprising:

retaining a first private key and transmitting a corresponding first initial public key and synchronizing indicator;

using a received second public key and second synchronizing indicator in combination with said retained first private key to determine, and retain, a first encryption key;

determining a second private key, a third public key and a third synchronizing indicator, wherein said second private key is retained with said first retained private key;

encrypting at least said third synchronizing indicator using said first encryption key;

transmitting said third public key and encrypted third synchronizing indicator;

decrypting a received fourth synchronizing indicator using said first encryption key; and determining a second encryption key from retained said second private key, a received fourth public key and decrypted said received fourth synchronizing indicator;

wherein said second encryption key is retained with said first encryption key, and said first and second encryption keys are dependent upon said second and fourth synchronizing indicators, respectively, such that if said first and second encryption keys are determined using different synchronizing indicators, data encrypted using said first and second encryption keys provides different encrypted data, respectively, and wherein said synchronizing indicators are used to alter the starting position of the encrypting sequence with the corresponding public keys.

2. The method as recited in claim 1 wherein said determining a next private key and a next information item set, encrypting at least one element of said next information item set, transmitting said encrypted next information element, decrypting said received encrypted information item element; and, determining a next encryption key from said next private key and said decrypted information item are repeated until a known number of encryption keys are determined.

3. The method as recited in claim 1 wherein the step of encrypting further comprises: selecting at least one of said retained encryption keys alternatively.

4. The method as recited in claim 3 wherein said encryption keys are selected in a known sequence.

5. The method as recited in claim 4 wherein said known sequence corresponds to an order of retention of said encryption keys.

6. The method as recited in claim 4 wherein said known sequence corresponds to an order pre-selected by said parties.

7. The method as recited in claim 1, wherein the step of encrypting further comprises: selecting a known encryption key.

8. The method as recited in claim 7 wherein said known encryption key is such that an output value is the same as an input value.

9. The method of claim 1, wherein said synchronizing indicators correspond to select bit positions.

* * * * *